R. BUCHER.
POSTAL EGG CONTAINER.
APPLICATION FILED JAN. 26, 1914.

1,281,504.

Patented Oct. 15, 1918.
2 SHEETS—SHEET 1.

Witnesses:
M. K. Morse.
J. Freudensel

Inventor
Reinhard Bucher
By his Attorneys
Prindle & Wright

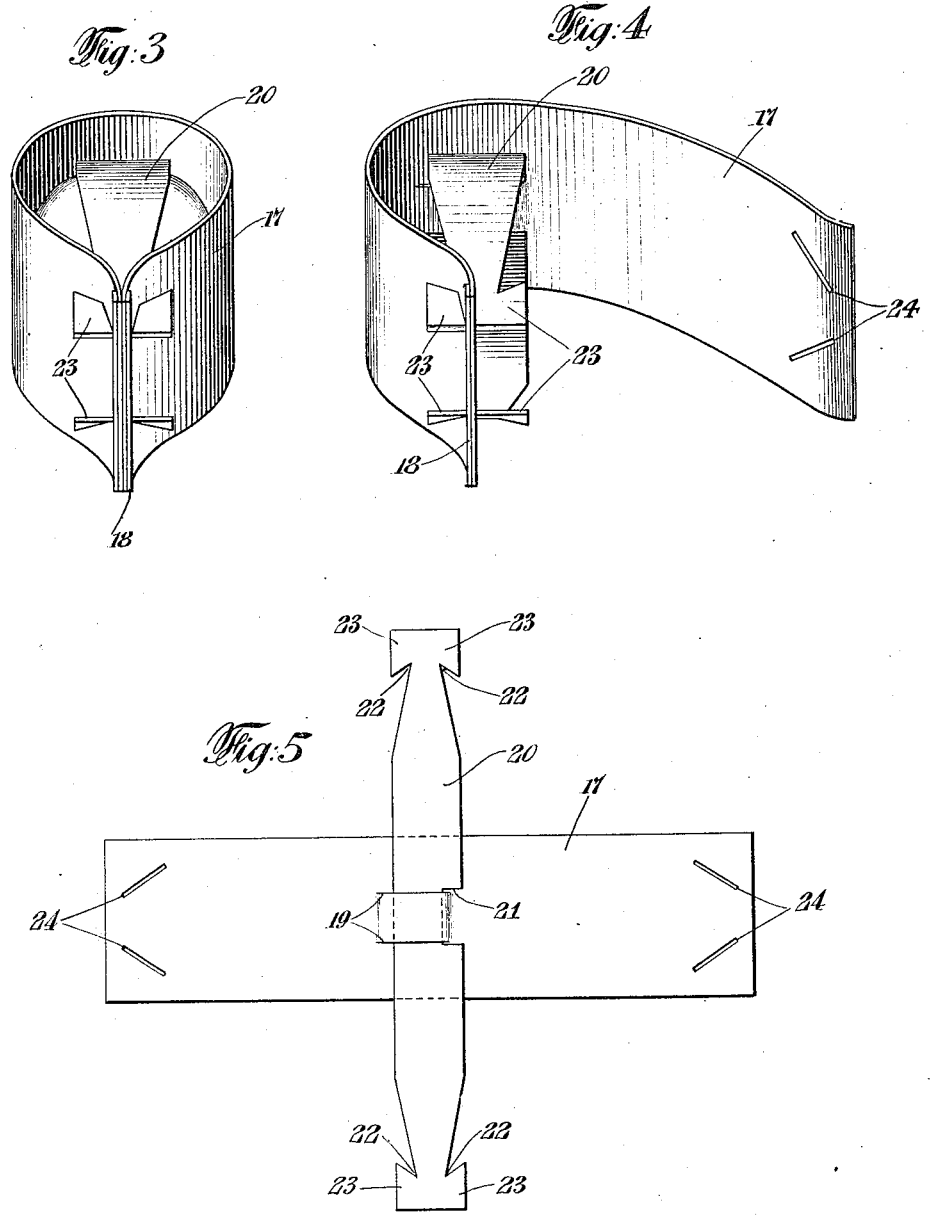

UNITED STATES PATENT OFFICE.

REINHARD BUCHER, OF LAKEWOOD, NEW JERSEY.

POSTAL EGG-CONTAINER.

1,281,504. Specification of Letters Patent. Patented Oct. 15, 1918.

Application filed January 26, 1914. Serial No. 814,371.

*To all whom it may concern:*

Be it known that I, REINHARD BUCHER, of Lakewood, in the county of Ocean, and in the State of New Jersey, have invented a certain new and useful Improvement in Postal Egg-Containers, and do hereby declare that the following is a full, clear, and exact description thereof.

My invention relates particularly to shipping packages for eggs, but more particularly to packages designed for shipping eggs through the mails.

It is well understood that packages which are shipped through the mails, as for example, by parcels post, are subjected to a considerable degree of rough handling, and that for this reason, if eggs are to be shipped through the mails they must be contained in packages which may be subjected to violent shocks at rather frequent intervals without damage.

The object of my invention is to provide an egg container which will tightly maintain the eggs in their places in the container; which will allow a degree of movement of the eggs in every direction; which will elastically support the eggs; and which is adapted to receive eggs of varying sizes without any special adjustment of the container. A further object of my invention is to provide an egg container of the above character, which is sufficiently strong to withstand any shocks to which packages sent through the mails are subjected.

While my invention is capable of embodiment in many different forms, for the purpose of illustration I have shown only one form thereof in the accompanying drawings, in which, Figure 1 is a vertical section of a container made in accordance with my invention;

Fig. 3 is a perspective view of one of the egg baskets in closed position;

Fig. 4 is a perspective view of the same in open position, preparatory to introducing an egg; and, Fig. 5 is a plan view of the parts of the egg basket in the position in which they are first attached together.

Figure 1:
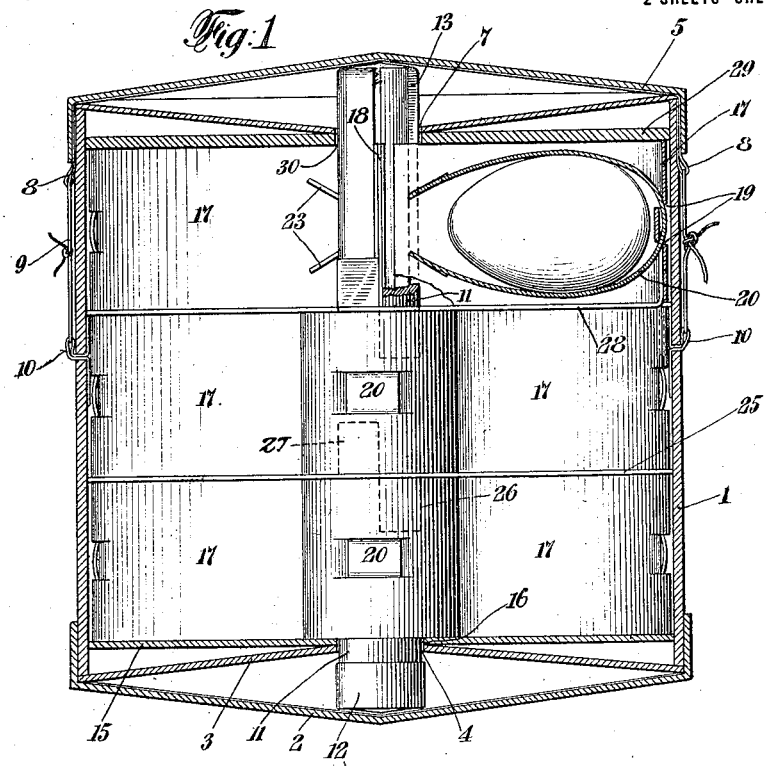
Figure 2:
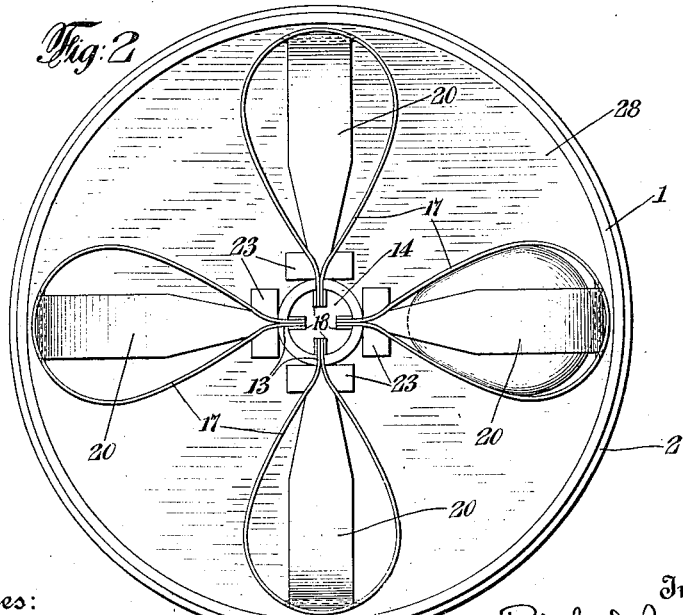
Fig. 2 is a horizontal section thereof.

In the drawings I have shown an outer casing having a cylindrical shell 1, which is closed by a bottom cover 2, the center of which is preferably bowed outwardly. This cover 2 preferably has upon its inner face an inwardly bowed cushion 3, having a central opening 4. The cover is permanently secured in place in any suitable manner. The cylindrical shell 1 is also provided with a top cover 5, the center of which is preferably bowed outwardly and having upon its inner face an inwardly bowed cushion, which is provided with a central opening 7. Attached to the edge of the top cover 5 there may be any suitable clamping means, but in the illustrated form of my invention I have shown for this purpose a plurality of loops 8 through which cords 9 may pass and be extended through a plurality of similar loops 10 located on the outside of the cylindrical shell 1 and which are passed through and fastened on the inside of the shell 1. Upon the interior of the shell 1, there is a central post 11 having a shoulder 12 near its bottom end and a plurality of slots 13 extending upwardly in the sides of the post. The post is also provided with a longitudinal opening 14, which extends downwardly to the same distance as the slots 13. A bottom partition 15 having a central opening 16 fits over the post 11 and is located above the shoulder 12. Upon the top of the bottom partition 15 there are provided a number of individual egg baskets which radiate from the center of the casing, each of which comprises a horizontal band 17 of cardboard or any suitable similar material, the free ends of which have shoulders 18 so that the ends of the horizontal band may be looped around the periphery of an egg and placed in one of the slots 13 in such a manner that the shoulders 18 prevent the band from being withdrawn from the slot. The horizontal band 17 has a pair of horizontal slits 19 at its center to receive a vertical band 20 which has a notch 21 so as to hold the band 20 at its center connected to the central portion of the band 17. It will be noted that the notch 21 is somewhat wider than the portion of the horizontal band 17 located between the slits 19 so as to allow of a certain degree of movement of the band 20 vertically with regard to the band 17. The length of the slits 19 also permit a similar movement of the horizontal band 17 with regard to the vertical band 20. The vertical band 20 near its two ends is provided on both sides of each of said ends with angular notches 22, one side forming an obtuse angle with the side of the band, and the other side of the notch forming an acute angle with the side of the band. The notches 22 thus form lateral projections on each side of each end of the lateral projections 23, which are arranged to fit into inclined slots 24 located near the ends of the horizontal band 17. Upon the top of the series of baskets which are situated adjacent to the bottom partition 15 there is located a diaphragm 25 which has around its edge opposite each of the egg baskets a downwardly extending tongue 26 which is much narrower than the width of the horizontal band 17 so as to permit a considerable degree of lateral movement of the egg basket. Upon the top of the diaphragm 25 there are supported a second series of egg baskets similar to those described as being supported upon the bottom partition 15 and for the purpose of holding these baskets in proper position tongues 27 extend upwardly from the edge of the diaphragm 25 into the egg baskets supported on the top of said diaphragm. Upon the top of the second series of egg baskets there is a further diaphragm 28 constructed in the same manner as the diaphragm 25 and on top of this diaphragm 28 there is a third series of egg baskets constructed in the same manner as the egg baskets already described. Upon the top of the third series of egg baskets there is a top partition 29 similar to the bottom plate 15, which top partition has a central opening 30 sufficiently small to clamp together the portions of the post 11 located between the slots 13 so as to tightly clamp the edges of all the horizontal bands 17 tightly together.

In the operation of my invention when it is designed to send a dozen eggs in the egg container, which is the capacity of the egg container shown in the drawings but the capacity of which may be readily changed by changing the size of the container, the central post 11 is drawn out and all of the parts removed from the post except the bottom partition 15. The eggs are then placed in the individual egg baskets by removing the projections 23 from the inclined slots 24 placing the eggs in the baskets, replacing the projections 23 in the slots 24, and sliding the ends of the horizontal bands 17 downwardly in the slots 13, until the first series of egg baskets has been filled with eggs. Thereafter the diaphragm 25 is placed upon this series of baskets; the second series of egg baskets is filled in a similar manner; the next diaphragm 28 is placed on the top thereof, the third series of egg baskets is filled in the same manner and the top plate 29 is forced over the end of the post 11, thereby clamping together the ends of all the egg baskets. The post 11 with the filled egg baskets is then inserted in the cylindrical shell 1 and the top cover 5 placed on top of the shell by causing the end of the post 11 to enter the central opening 7 in the cushion 6 on the top cover. The cords 9 are then passed through the loops 10 and tied down. If desired, any sort of sealing means, as for example, sealing wax may be applied to the cords 9 and the cylindrical shell 1. It will thus be seen that in the construction described the egg baskets are in the first place of such a character that they may yield to varying shapes of eggs, inasmuch as they have no fixed lateral diameter and no fixed longitudinal diameter. Furthermore, the eggs are capable of a considerable degree of lateral movement owing to the narrow width of the tongues 26 and 27. Furthermore, the vertical bands 20 are capable of movement vertically with respect to the horizontal bands 17 owing to the width of the notches 21 and the vertical bands 20 are also capable of lateral movement with respect to the horizontal bands 17 owing to the length of the slits 19. At the same time the parts are maintained within certain limits in a fixed relation owing to the clamping effect of the post 11 upon the ends of the horizontal bands 17, the rigid vertical portions of the horizontal bands between the bottom plate 15 and the top plate 29, and the fact that the different parts permitting movement are arranged to limit the total movement permitted in each instance.

While I have described my invention above in detail, I wish it to be understood that many changes may be made therein without departing from the spirit of my invention.

I claim:—

1. An egg container comprising a casing and a plurality of layers of individual egg sustaining baskets therein, said baskets being individually removable, and transverse partitions holding said layers in position, said baskets supporting the eggs spaced from each partition and from the side walls of the casing.

2. An egg container comprising a cylindrical casing having a horizontal support, and means for holding the eggs from lateral movement comprising vertical walls radiating from the center of the cylinder, and shaped to inclose closely the peripheries of eggs disposed within said casing.

3. An egg container comprising a casing, a plurality of bands extending from the center of said casing and each forming a loop adapted to engage closely the periphery of an egg, said loops being supported adjacent the center of the casing.

4. An egg container comprising a cylindrical casing having a central post, a plurality of individually removable egg baskets therein, and means for removably securing each of said baskets directly to said post.

5. An egg container, comprising a casing, a central post having a slot and individual egg baskets supporting the eggs apart having bands clamped in said slot.

6. An egg container, comprising a casing, a central post having a slot and egg baskets having bands clamped in said slot, and having other bands secured in said first mentioned bands in positions at right angles thereto.

7. An egg container, comprising a casing, a central post having a slot, individual egg baskets supporting the eggs apart having bands clamped in said slot, the egg baskets being arranged in a plurality of layers and diaphragms holding them in place.

8. An egg container, comprising a casing, a central post having a slot, egg baskets having bands clamped in said slot, and having other bands in a different plane therefrom secured in said first mentioned bands, the egg baskets being arranged in a plurality of layers and diaphragms holding them in place.

9. An egg container, comprising a casing, a central post having a slot, egg baskets having bands clamped in said slot, the egg baskets being arranged in a plurality of layers and diaphragms holding them in place, the diaphragms having tongues extending into the first mentioned bands and being narrower than the space into which they extend.

10. An egg container, comprising a casing, a central post having a slot, egg baskets having bands clamped in said slot, and having other bands secured in said first mentioned bands, adapted to engage the egg in a different plane therefrom, the egg baskets being arranged in a plurality of layers and diaphragms holding them in place, the diaphragms having tongues extending into the first mentioned bands and being narrower than the space into which they extend.

11. An egg container, comprising a casing, a central post having a slot and egg baskets having bands clamped in said slot, and having other bands secured in said first mentioned bands for movement laterally and vertically in regard thereto.

12. An egg container, comprising a casing, a central post having a slot, egg baskets having bands clamped in said slot, and having other bands secured in said first mentioned bands for movement laterally and vertically in regard thereto, the egg baskets being arranged in a plurality of layers and diaphragms holding them in place.

13. An egg container, comprising a casing, a central post having a slot, egg baskets having bands clamped in said slot, and having other bands secured in said first mentioned bands for movement laterally and vertically in regard thereto, the egg baskets being arranged in a plurality of layers and diaphragms holding them in place, the diaphragms having tongues extending into the first mentioned bands and being narrower than the space into which they extend.

14. An egg container comprising a casing, a central post, individual egg baskets attached thereto supporting the eggs apart, and an inwardly bowed cushion maintaining the post and egg baskets in place.

15. An egg basket having flexible bands of sheet material extending at an angle to each other and adapted to be bent to engage the periphery of an egg, and to support the egg between said bands, the ends of said bands being provided with interengaging parts to hold them in position.

16. An egg basket comprising a band adapted to be bent to conform substantially to the shape of an egg, a second band of a similar nature located within said first mentioned band when the latter is so bent, and means for securing together the ends of said band whereby the second band is adapted to support the egg spaced from the edges of the first band.

In testimony that I claim the foregoing I have hereunto set my hand.

REINHARD BUCHER.

Witnesses:
 FRED BUCHER,
 WALTER C. O'LEARY.

Copies of this patent may be obtained for five cents each, by addressing the "Commissioner of Patents, Washington, D. C."